United States Patent
Moenickheim et al.

(10) Patent No.: US 7,177,846 B2
(45) Date of Patent: Feb. 13, 2007

(54) TECHNIQUE FOR ACCOUNT AUTHENTICATION

(75) Inventors: Peter Moenickheim, Dublin, OH (US); Paul J. Lyda, Powell, OH (US)

(73) Assignee: Checkfree Corporation, Norcross, GA (US)

( * ) Notice: Subject to any disclaimer, the term of this patent is extended or adjusted under 35 U.S.C. 154(b) by 804 days.

(21) Appl. No.: 10/206,239

(22) Filed: Jul. 29, 2002

(65) Prior Publication Data

US 2004/0019568 A1 Jan. 29, 2004

(51) Int. Cl.
*G06Q 99/00* (2006.01)

(52) U.S. Cl. .............. 705/64; 705/50; 705/72; 705/75; 705/78; 713/150

(58) Field of Classification Search ........... 705/50–79, 705/35, 39–45; 713/150
See application file for complete search history.

(56) References Cited

U.S. PATENT DOCUMENTS

| | | | |
|---|---|---|---|
| 4,823,264 A | 4/1989 | Deming | |
| 5,025,373 A | 6/1991 | Keyser, Jr. et al. | |
| 5,220,501 A | 6/1993 | Lawlor et al. | |
| 5,283,829 A | 2/1994 | Anderson | |
| 5,326,959 A | 7/1994 | Perazza | |
| 5,336,870 A | 8/1994 | Hughes et al. | |
| 5,383,113 A | 1/1995 | Kight et al. | |
| 5,420,405 A | 5/1995 | Chasek | |
| 5,465,206 A | 11/1995 | Hilt et al. | |
| 5,504,677 A | 4/1996 | Pollin | |
| 5,677,955 A | 10/1997 | Doggett et al. | |
| 5,699,528 A | 12/1997 | Hogan | |
| 5,710,889 A | 1/1998 | Clark et al. | |
| 5,727,249 A | 3/1998 | Pollin | |
| 5,794,221 A | 8/1998 | Egendorf | |
| 5,873,072 A | 2/1999 | Kight et al. | |
| 5,884,288 A | 3/1999 | Chang et al. | |
| 5,920,847 A | 7/1999 | Kolling et al. | |
| 5,920,848 A | 7/1999 | Schutzer et al. | |
| 5,966,698 A | 10/1999 | Pollin | |
| 5,974,146 A | 10/1999 | Randle et al. | |
| 5,978,780 A | 11/1999 | Watson | |
| 6,029,150 A | 2/2000 | Kravitz | |
| 6,032,133 A | 2/2000 | Hilt et al. | |
| 6,098,053 A | 8/2000 | Slater | |
| 6,188,994 B1 | 2/2001 | Egendorf | |
| 6,311,170 B1 | 10/2001 | Embrey | |
| 2001/0037295 A1 | 11/2001 | Olsen | |

(Continued)

FOREIGN PATENT DOCUMENTS

GB 2333878 * 4/1999

OTHER PUBLICATIONS

Shockley, W.R., "Identification and Authentication when Users have Multiple Accounts", 1993, ACM, p. 185-191.*

*Primary Examiner*—Jalatee Worjloh
(74) *Attorney, Agent, or Firm*—Sutherland Asbill & Brennan, LLP (57) ABSTRACT

A technique for confirming an association between a deposit account and an account holder is provided. The technique includes receiving information identifying the deposit account and identifying the account holder. Other information associated with multiple deposit accounts, each maintained at one of multiple financial institutions, is accessed. The received information and the accessed information are then processed to authenticate the association between the account holder and the deposit account.

48 Claims, 2 Drawing Sheets

U.S. PATENT DOCUMENTS

2002/0004772 A1    1/2002   Templeton et al.
2002/0040346 A1*   4/2002   Kwan .......................... 705/51
2003/0093367 A1*   5/2003   Allen-Rouman et al. ..... 705/39
2003/0200180 A1*  10/2003   Phelan et al. ................. 705/65
2004/0199466 A1*  10/2004   Chi .............................. 705/42

* cited by examiner

TECHNIQUE FOR ACCOUNT AUTHENTICATION

FIELD OF THE INVENTION

The present invention relates to electronic commerce, and more particularly to authentication of deposit account information.

BACKGROUND OF THE INVENTION

On-line payment service providers make payments on behalf of payors to payees. In making a payment on behalf of a payor, an on-line payment service provider debits a deposit account belonging to the payor and issues a credit to the payee, either electronically, by check drawn on an account belonging to the on-line service provider, or by draft drawn from the payor's deposit account. It will be understood by one skilled in the art that drafts serve as both the debit and the credit vehicle.

A payor must register with an on-line payment service provider to access services offered by the on-line payment service provider. The registration process, which can be either on-line, typically via the World Wide Web, or by paper forms, includes the payor (registering customer) providing information identifying a demand deposit account, such as a checking account, belonging to the payor to the on-line payment service provider. This identifying information includes a unique routing and transit number (RTN), which identifies the financial institution at which the deposit account is maintained, as well as a unique account number (DDA) identifying the payor's deposit account maintained at the financial institution. Together, this information is known as RTN/DDA information, and alternatively RT/DDA information.

For both on-line and paper registration, the registering customer has conventionally been required to supply the on-line payment service provider a voided check from the deposit account. This voided check is used as a fraud prevention measure to authenticate the association between the registering customer and the deposit account. Thus, in conventional enrollment, a registering customer has not been able to immediately direct an on-line payment service provider to make payments on his or her behalf, as the voided check must physically be delivered to the on-line payment service provider, and then the voided check must be authenticated by a customer service representative of the on-line payment service provider.

Recently, new completely on-line and real-time registration techniques have been introduced. In one, a trusted agent, typically a consumer service provider (CSP), guarantees to indemnify an on-line payment service provider against fraud committed by a registering customer that the CSP represents. No attempt is made by the on-line service provider to authenticate the association between the registering customer and that registering customer's deposit account.

In another completely on-line and real-time registration technique, the registering customer's identity is verified, by leveraging one or more commercial databases, while the registering customer is participating in an on-line registration session. While the registering customer's identity is verified, an association between the registering customer's deposit account and the registering customer is not authenticated. At most, the on-line payment service provider can be assured that the registering customer is who he or she purports to be. Based upon a verified identity, on-line payment service providers have found that there is less chance of the registering customer providing fraudulent information identifying a deposit account. These two techniques each allow a registering customer the convenience of immediately directing payments.

In both of these completely on-line and real-time techniques, a registering customer is required to enter RTN/DDA information. As the registering customer is not required to supply a voided check, the sole source of this information is the registering customer. On-line payment services have found that registering customers often make mistakes in entering these numbers. On-line payment services, in rectifying these unintentional mistakes, incur customer service costs. In addition, fraudulent deposit account identifying information is also still received under both completely online registration techniques. Even when a CSP indemnifies an on-line payment service, costs are still associated with the fraud.

Other new registration techniques have also been introduced. These techniques are not completely on-line or real-time. In one technique, a financial institution at which a customer's account is maintained supplies RTN/DDA information. While an association between a customer and an account is authenticated because the financial institution itself supplies RTN/DDA information, this does not occur during an on-line and real-time enrollment session with a customer. In another technique, a registering customer provides RTN/DDA information during an on-line session. Subsequent to the session, a service provider makes one or more small debits and/or credits, via electronic funds transfer, from/to the customer's account. The customer then determines the amount(s) and initiates another on-line session with the service provider and identifies the amount(s) to the service provider. If the customer supplied amount(s) is/are correct, the service provider has a high level of confidence that the account is actually associated with the registering customer. However, the enrollment process can not be completed fully in a single session, as the consumer must take some action (determining the amount(s)) subsequent to an initial registration session.

Accordingly, a need exists for an on-line and real-time technique to authenticate an association between a registering customer and a demand deposit account which mitigates occurrence of both incorrect entry of RTN/DDA information and fraud.

Some on-line payment services access more than one commercial database in the registration process in attempting to locate information used to authenticate a registering customer's identity (not to authenticate an association between a customer and a deposit account). Often an on-line service provider must access multiple commercial databases before useful information is found. These commercial databases charge for access, making this an expensive process.

Accordingly a need exists for a technique for registration for electronic commerce service which minimizes costs associated with utilizing information belonging to an entity other than an electronic commerce service provider.

OBJECTS OF THE INVENTION

It is an object of the present invention to provide a technique of registration for electronic commerce services which protects an on-line commerce service from fraud.

It is also an object of the present invention to provide a technique of registration for electronic commerce services which is convenient for registering customers.

It is yet another object of the present invention to provide a technique of registration for electronic commerce services which is cost efficient.

It is still another object of the present invention to provide a technique of registration for electronic commerce services in which information associated with a registering customer is accurately received.

It is also an object of the present invention to provide a technique of registration for electronic commerce services which determines in which ones of multiple databases useful information is likely to be stored.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and a system for authenticating an association between a deposit account and an account holder are provided. The system includes a communications interface and a processor. The communications interface is configured to receive, via one or more networks, information associated with deposit accounts and to access information associated with deposit accounts. The one or more networks can include, but is not limited to, the Internet, a local area network, a wide area network, and the public switched telephone network. The accessing of information can include accessing one or more memories capable of storing data. Further, the accessing of the one or more memories can be a direct accessing as well as an accessing via a network. The processor could be any type of processor capable of functioning to implement the method as described herein, including, but not limited to, a processor as found in a typical personal computer, mainframe computer, server-type computer, or any other type computing device.

First information which identifies a first deposit account and an account holder is received. The deposit account could be a checking account, a money-market account, a savings account, or any other type of account from which funds can be accessed at will by an account holder. An account holder could be an individual, a business, or other organization to which funds in the first deposit account belong.

Second information associated with a plurality of deposit accounts, each maintained at one of a plurality of financial institutions, is accessed. The second information pertains to multiple deposit accounts maintained at multiple financial institutions, not multiple deposit accounts maintained at a single financial institution. This accessing could be the accessing of local or remote data. Also the second information could belong to the entity receiving the first information or another entity, such as a check printing service, a check guarantee service, or a single financial institution.

The first and second information are processed together to authenticate an association between the first deposit account and the account holder. The processing authenticates that the first deposit account is associated with, and the funds therein belong to, the account holder. This processing could be performed as a batch process, or as a real-time process.

In accordance with a particularly beneficial aspect of the present invention, the second information is information that is maintained by a check printing service. A check printing service is any entity that prints blank checks on behalf of account holders and/or financial institutions. The maintained information includes at least information identifying an account holder and information identifying a deposit account associated with that account holder. Thus, the received first information is processed with second information maintained by a check printing service to authenticate the association between the account holder and the first deposit account.

In another aspect of the present invention, before the second information is accessed, third information is accessed. This third information is associated with another plurality of deposit accounts each maintained at one of a plurality of financial institutions. Like the second information, the third information pertains to multiple deposit accounts maintained at multiple financial institutions, not multiple deposit accounts maintained at a single financial institution. The first information and the third information are processed together to authenticate the association. If the processing of the first and the third information authenticates the association, the second information is not accessed and processed.

According to a further aspect of the present invention, the third information is associated with an entity receiving the first information. The entity that receives the first information maintains the third information. Preferably, the third information is information collected and maintained by the receiving entity, though it could be obtained by other avenues other than a collection by the receiving entity.

According to another aspect of the present invention, before the first and second information are processed to authenticate the association, the accessed second information is processed to determine if information associated with the first deposit account is included in the second information. This processing determines if any information associated with the first deposit account is included in the second information. If the processing of the second information results in a determination that information associated with the first deposit account is included in the second information, the first and second information are then processed to authenticate the association.

In another particularly beneficial aspect of the present invention, third information associated with another plurality of deposit accounts is stored. This other plurality of deposit accounts are each maintained at one of a plurality of financial institutions. Like the second information, this third information pertains to multiple deposit accounts maintained at multiple financial institutions. This third information could be stored by the entity receiving the first information, or could be stored by another entity.

Prior to accessing the second information, an order in which to access the second and third information is determined. The order could be to access the second information first, followed by an accessing of the third information. Or, the order could be to access the third information first, followed by an accessing of the second information. Based upon the determined order, a first ordered one of the second and third information is accessed.

The first information and the accessed first ordered one of the second and third information are processed to authenticate the association. If the association is not authenticated from the processing of the first information and the accessed first ordered information, the second ordered one of the second and third information is accessed. The first information and the accessed second ordered one of the second and third information are processed to authenticate the association.

According to a further aspect of the present invention, the ordering is based upon at least one of a routing number associated with the financial institution at which the first deposit account is maintained, geography, cost, and a number of successful authentications based upon information belonging to an entity other than the account holder and the financial institution at which the first deposit account is maintained. Thus, the ordering could be based upon any one or more of the identity of the financial institution at which the first deposit account is located, a physical location of the account holder, such as state or city of residence, a physical location of the financial institution at which the first deposit account is maintained, any fees charged by entities to whom the second and third information may belong if either the second or third information does not belong to the entity receiving the first information, and historical data pertaining to past authentication attempts.

In still another aspect of the present invention, the first information is received by a first electronic commerce service provider. An electronic commerce service provider can include an on-line payment service provider, as well as other types of electronic commerce service providers. The first information is received from one of the account holder, a sponsor associated with the account holder, and a second electronic commerce service provider. A sponsor is an entity which provides access to services offered by the first electronic commerce service provider to one or more account holders. A second electronic commerce service provider provides electronic commerce services to an account holder, while the first electronic commerce service authenticates the association on behalf of the second electronic commerce service provider.

In a further aspect of the present invention, the first information is received during an on-line session for registering for electronic commerce services and the second information is accessed and processed during the on-line session. Thus, in accordance with this further aspect, the first information is received and the association is authenticated in a single session. The entity from whom the first information is received is not required to initiate a second on-line session to ascertain the result of the authentication.

In a still further aspect of the present invention, the accessed second information is hosted by the first electronic commerce service provider. Because the second information is hosted by the first electronic commerce service provider, the first electronic commerce service provider does not have to contact another entity to perform the accessing. Preferably, according to this aspect, the hosted information belongs to entity other than the first electronic commerce service provider.

According to yet another aspect of the present invention, the first electronic commerce service provider provides the service of making payments on behalf of payors. In making a payment on behalf of a payor, the first electronic commerce service provider receives a request from an account holder to make a payment to a payee. As a part of the payment service, the first electronic commerce service provider accesses a deposit account associated with this payor. The accessing could be an electronic funds transfer, or could be an accessing by way of a draft or check prepared by the first electronic commerce service provider.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
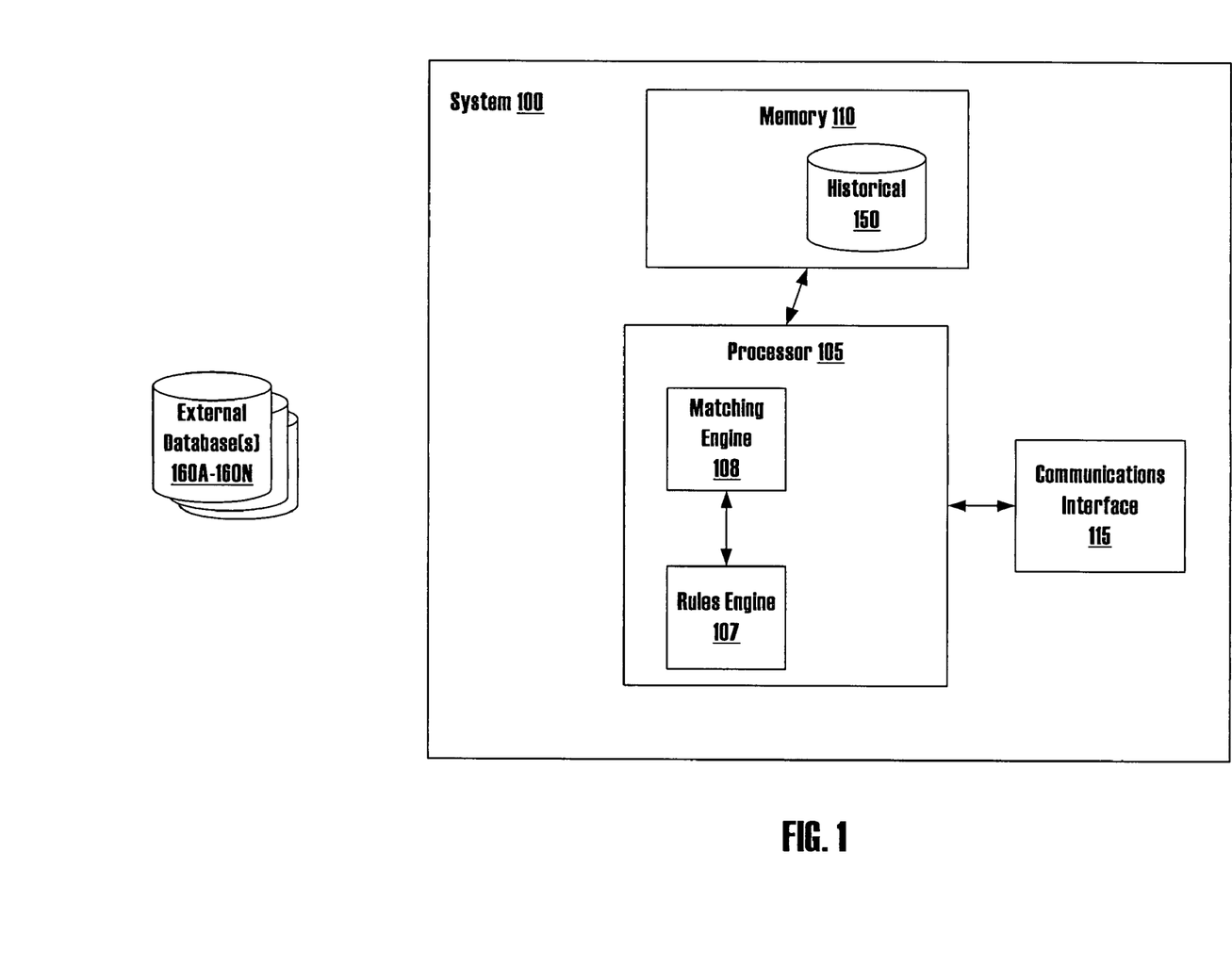
FIG. 1 depicts a computing system maintained by an electronic commerce service provider.

FIG. 1 shows an electronic commerce service system 100 maintained by an electronic commerce service provider (hereinafter, service provider). Included in system 100 is a processor 105 which is driven by instructions stored in memory 110. Processor 105 could be multiple processors working either in concert or independently to provide the functionality described herein. Likewise, memory 110 could be multiple memories. Processor 105 includes a rules engine 107 and a matching engine 108, which will be discussed below. Also shown is a communications interface 115 for communicating with registering customers and other entities. Though only one communications interface 115 is depicted, it should be understood that multiple communications interfaces could be included in system 100. Memory 110, in addition to storing the above described instructions, also stores a historical database 150 which stores information associated with registrations of each of multiple registering customers, data accumulated during provision of electronic commerce services, as well as other information used to determine which external databases (described below) to access during an on-line and real-time registration session. It will be appreciated that registration processing could be performed as a batch process. That is, not in real-time.

Also depicted in FIG. 1, though not necessarily a part of system 100, are multiple external databases 160A–160N. These external databases store information gathered by entities other than the service provider. Information stored in these external databases 160A–160N is utilized to authenticate an association between a registering customer and a deposit account.

These external databases 160A–160N belong to any one of, or any combination of, check printing services, check verification services, check guarantee services, and financial institutions. Examples of check printing services are Deluxe, Harland, and Clark American, though other check printing services' databases could also be accessed. Examples of check verification and/or guarantee services are Telecheck and Equifax Check Services, though other check verification and/or guarantee services' databases could also be accessed. A financial institution maintains deposit accounts on behalf of depositors, in addition to providing other financial services. A financial institution, obviously, has knowledge of associations between accounts that financial institution maintains and depositors (customers). A financial institution may have knowledge about associations between accounts and depositors for accounts that are maintained at other financial institutions. Information stored in external database 160A–160N is associated with deposit accounts. Check printing services retain information associated with each check order printed for an account holder. This information is typically retained so that a subsequent check order for the account holder can be printed without all account holder identifying and account identifying information being supplied a second time in order to print the second order. Thus, check printing services maintain information that authenticates an association between an account holder and an account.

It should be noted that one or more of the external databases 160A–160N, though belonging to an entity other than the service provider, could be hosted by the service provider. In such a case, a third party such as a check printing, verification, or guarantee service, would provide information to be stored to the service provider. The service provider would then access the service provider hosted external database(s) as necessary.

Figure 2:
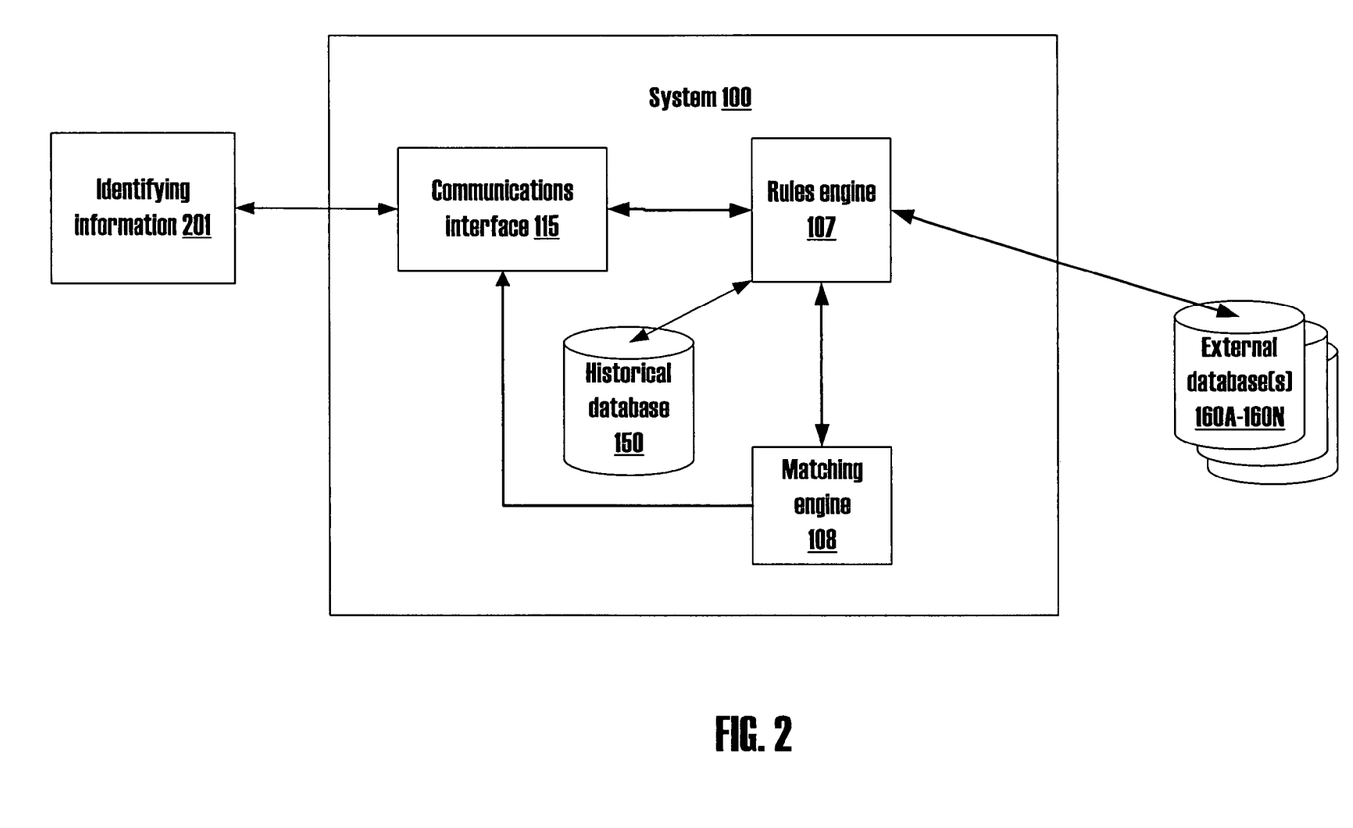
FIG. 2 depicts the processing to authenticate an association between a deposit account and a registering customer.

As shown in FIG. 2, a registering customer provides, during an on-line enrollment session, preferably via a World Wide Web interface, identifying information 201 such as one or more of name, drivers license number, and social security number to system 100. This information is received by communications interface 115. Any or all of this identifying information could be provided, in addition to other forms of identifying information. The registering customer also provides RTN/DDA information identifying a deposit account which they are authorizing the service provider to access. It should be noted that identifying information could be received from an entity other than a registering customer, such as a sponsor. Sponsors provide access to electronic commerce services on behalf of customers.

This received information is then processed by the rules engine 107 while the registering customer is still participating in the on-line enrollment session. The rules engine 107 first determines if historical database 150 contains information upon which a positive authentication between the registering customer and the customer's deposit account can be based. If so, the on-line registration session can be successfully completed without accessing commercial databases.

If the historical database 150 does not contain information which leads to a successful registration, then based upon logic derived from historical registration experience and other information contained in the historical database 150, the rules engine 107 determines which of external databases 160A–160N to access to authenticate an association between the registering customer and a deposit account. Criteria that can be used by the rules engine 107 in determining which external database to access includes the registering customer's financial institution's RTN (ABA) number. This information can be used because, based upon the historical information stored in the historical database 150, it is known that certain financial institutions utilize certain check printing services.

Other criteria that can be utilized to determine which of the external databases 160A–160N to access includes geographic criteria, such as the location of the registering customer and/or his or her financial institution. Yet another criteria is cost. That is, fees charged by entities maintaining external databases 160A–160N for accessing different ones of the external databases 160A–160N vary among the external databases. Still another criteria is a success rate of particular ones of the external databases 160A–160N in providing information useful in the registration process.

The rules engine 107 determines an order in which to access the external databases 160A–160N. Once the rules engine 107 determines the order in which the external databases 160A–160N should be accessed, the first determined external database is accessed in an attempt to location information upon which to base an authentication determination.

If information upon which to base an authentication determination is not found in the first determined external database, the second determined external database is accessed. This process continues until information is found. It should be noted that if information for successful authentication information is not found in any database or other data store, the registering customer could be given the opportunity, on-line and in-session, to resubmit account identifying information, in view of the chance that the registering customer may have provided incorrect identifying information beforehand.

Once information is found in an external database, all or a portion of the information gathered via the web interface from the registering customer is used by the matching engine 108 in authenticating the RTN/DDA information received from the registering customer. That is, the matching engine 108 compares the RTN/DDA information and the identity information received from the registering customer with data stored in the external database. If the received data matches that supplied by the registering customer, the association is successfully authenticated.

Upon successful authentication, the registering customer is informed, via the on-line registration session, that registration is successful. The registering customer becomes a registered customer. The service provider can immediately and in-session provide services to the registered customer with confidence that an authentic association between the registered customer and a deposit account identified by that customer is in fact authentic.

In the event that on-line authentication of customer supplied information is unsuccessful, the registering customer would be required to complete the registration process by traditional techniques. This could include, for instance, requiring the registering customer to supply a voided check to the service provider, as well as any other known registration technique.

In a variation of the above-described process, instead of accessing the external databases 160A–160N in a determined order to determine if each database includes information which can be used in the authentication process, each of external databases 160A–160N are accessed, in the same determined order as above, and an authentication attempt is made against data stored in each external database. Thus, the first determined external database is accessed, and based upon data stored in that database an authentication attempt is made. If that authentication attempt is unsuccessful, the second determined external database is accessed and another authentication attempt is made. This process continues until a successful authentication is made, or until each database has been accessed. As above, if on-line authentication is unsuccessful, the registering customer would have to complete the registration process in an off-line fashion. In another variation, external databases 160A–160N could be accessed in a random order.

In yet another variation of the above-described process, an entity to whom an external database belongs might not offer direct access to the information stored in the database. In such a case, the service provider transmits at least a portion of the received identifying information as well as the RTN/DDA information to the entity to whom the external database belongs. That entity then compares this received information with information contained in the database.

That entity then returns a match key to the service provider. The match key could be one of four types: Account Found-Full Match, Account Found-No Match, Account Not Found, and Account Found-Possible Match. If the match key is of the Account Found-Full Match type, the authentication is successful. If the match key is of either the Account Found-No Match or Account Not Found types, the authentication is not successful and conventional, off-line, authentication techniques could be utilized. If the match key is of the Account Found-Possible Match type, further on-line activity can be performed to complete the authentication. This further activity could include the service provider providing further received identifying information to the entity to whom the database belongs, and could include the service provider querying the registering customer, via the still active on-line session, for additional identifying information, which would then be transmitted to the entity to whom the database belongs for further processing. It will be appreciated that the returned Match Key could be processed with other information to make the determination that authentication is successful or not. This other information could belong to the entity receiving the Match Key, or another entity. Also, instead of being processed with other information, a returned Match Key could be just one factor considered when making a determination as to a successful or unsuccessful authentication.

It should be noted that the inventive technique of on-line authentication of RTN/DDA information could be performed by the service provider on behalf of an entity other than the service provider. This authentication process could be performed in real-time, via perhaps a Web-based interface or a direct connection between another entity and the service provider, or could be performed as an asynchronous (e.g. batch file based or messaging-based) process for another entity. Further, it will be appreciated that the account authentication technique disclosed herein can be performed in a batch mode.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

We claim:

1. A method for authenticating an association between a deposit account and an account holder, comprising:
   receiving first information identifying a first deposit account and an account holder;
   accessing second information associated with a plurality of deposit accounts, each one of the plurality of deposit accounts maintained at one of a plurality of financial institutions;
   processing the received first information and the accessed second information to authenticate an association between the first deposit account and the account holder;
   prior to accessing the second information, accessing third information associated with another plurality of deposit accounts each maintained at one of a plurality of financial institutions; and
   processing the received first information and the accessed third information to authenticate the association, wherein the second information is only accessed and processed if the processing of the first and third information does not authenticate the association.

2. The method of claim 1, wherein:
   the first information is received by a first electronic commerce service provider; and
   the first information is received from one of the account holder, a sponsor associated with the account holder, and a second electronic commerce service provider.

3. The method of claim 2, wherein:
   the first information is received during an on-line session for registering for electronic commerce services; and
   the second information is accessed and processed during the on-line session.

4. The method of claim 3, wherein the accessed second information is hosted by the first electronic commerce service provider.

5. The method of claim 3, wherein the first electronic commerce service provider provides the service of making payments on behalf of payors.

6. The method of claim 1, wherein the second information is maintained by a check printing service.

7. The method of claim 1, wherein the third information is associated with an entity receiving the first information.

8. A method for authenticating an association between a deposit account and an account holder, comprising:
   receiving first information identifying a first deposit account and an account holder;
   accessing second information associated with a plurality of deposit accounts, each one of the plurality of deposit accounts maintained at one of a plurality of financial institutions;
   processing the accessed second information to determine if information associated with the first deposit account is included in the second information; and
   processing the received first information and the accessed second information to authenticate an association between the first deposit account and the account holder, wherein the first information and the accessed second information are processed to authenticate the association only if it is determined that information associated with the first deposit account is included in the second information.

9. The method of claim 8, wherein:
   the first information is received by a first electronic commerce service provider; and the first information is received from one of the account holder, a sponsor associated with the account holder, and a second electronic commerce service provider.

10. The method of claim 9, wherein:
    the first information is received during an on-line session for registering for electronic commerce services; and
    the second information is accessed and processed during the on-line session.

11. The method of claim 10, wherein the accessed second information is hosted by the first electronic commerce service provider.

12. The method of claim 10, wherein the first electronic commerce service provider provides the service of making payments on behalf of payors.

13. The method of claim 8, wherein the second information is maintained by a check printing service.

14. The method of claim 8, further comprising:
    prior to accessing the second information, determining an order in which to access the second information and third information, wherein the third information is associated with another plurality of deposit accounts.

15. The method of claim 14, wherein the ordering is based upon at least one of a routing number associated with the financial institution, geography, cost, and a number of successful authentications based upon information belonging to an entity other than the account holder and the financial institution.

16. The method of claim 14, wherein the third information is associated with an entity receiving the first information.

17. A method for authenticating an association between a deposit account and an account holder, comprising:
receiving first information identifying a first deposit account and an account holder;
accessing second information associated with a plurality of deposit accounts, each one of the plurality of deposit accounts maintained at one of a plurality of financial institutions;
processing the received first information and the accessed second information to authenticate an association between the first deposit account and the account holder;
wherein third information associated with another plurality of deposit accounts is stored, each one of the other plurality of deposit accounts maintained at one of a plurality of financial institutions, and further comprising:
prior to accessing the second information, determining an order in which to access the second information and the third information;
accessing a first ordered one of the second and third information;
processing the first information and the accessed first ordered information to authenticate the association between the first deposit account and the account holder;
if the association is not authenticated based upon the processing of the first information and the first ordered information, accessing a second ordered one of the second and third information;
processing the first information and the accessed second ordered information to authenticate the association between the first deposit account and the account holder; and
wherein the second information is one of the first ordered information and the second ordered information.

18. The method of claim 17, wherein the ordering is based upon at least one of a routing number associated with the financial institution, geography, cost, and a number of successful authentications based upon information belonging to an entity other than the account holder and the financial institution.

19. The method of claim 17, wherein:
the first information is received by a first electronic commerce service provider; and the first information is received from one of the account holder, a sponsor associated with the account holder, and a second electronic commerce service provider.

20. The method of claim 19, wherein:
the first information is received during an on-line session for registering for electronic commerce services; and
the second information is accessed and processed during the on-line session.

21. The method of claim 20, wherein the accessed second information is hosted by the first electronic commerce service provider.

22. The method of claim 20, wherein the first electronic commerce service provider provides the service of making payments on behalf of payors.

23. The method of claim 17, wherein the second information is maintained by a check printing service.

24. The method of claim 17, wherein the third information is associated with an entity receiving the first information.

25. A system for authenticating an association between a deposit account and an account holder, comprising:
a communications interface configured to receive first information identifying a first deposit account and an account holder and access second information associated with a plurality of deposit accounts each maintained at one of a plurality of financial institutions wherein the communications interface is further configured to access third information associated with another plurality of deposit accounts each maintained by one of a plurality of financial institutions;
a processor configured to cause the communications interface to access the second information and process the received first information and the accessed second information to authenticate an association between the first deposit account and the account holder; wherein the processor is further configured to cause the communications interface to access the third information and process the received first information and the third information to authenticate the association; and
wherein the second information is only accessed and processed if the processing of the first and third information does not authenticate the association.

26. The system of claim 25, wherein:
the first information is received by a first electronic commerce service provider; and
the first information is received from one of the account holder, a sponsor associated with the account holder, and a second electronic commerce service provider.

27. The system of claim 26, wherein:
the first information is received during an on-line session for registering for electronic commerce services; and
the processor is further configured to cause the second information to be accessed and processed during the on-line session.

28. The system of claim 27, further comprising:
a memory configured to store the second information;
wherein the first electronic commerce service provider hosts the second information on behalf of an entity other than the first electronic commerce service provider.

29. The system of claim 27, wherein the first electronic commerce service provider provides the service of making payments on behalf of payors.

30. The system of claim 25, wherein the second information is maintained by a check printing service.

31. The system of claim 25, further comprising:
a memory configured to store the third information;
wherein the third information is associated with an entity operating the system.

32. A system for authenticating an association between a deposit account and an account holder, comprising:
a communications interface configured to receive first information identifying a first deposit account and an account holder and access second information associated with a plurality of deposit accounts each maintained at one of a plurality of financial institutions;
a processor configured to cause the communications interface to access the second information and process the received first information and the accessed second information to authenticate an association between the first deposit account and the account holder, wherein the processor is further configured to process the accessed second information to determine if information associated with the first deposit account is included in the second information; and
wherein the first information and the accessed second information are processed to authenticate the association only if it is determined that information associated with the first deposit account is included in the second information.

33. The system of claim 32, wherein:
the first information is received by a first electronic commerce service provider; and
the first information is received from one of the account holder, a sponsor associated with the account holder, and a second electronic commerce service provider.

34. The system of claim 33, wherein:
the first information is received during an on-line session for registering for electronic commerce services; and
the processor is further configured to cause the second information to be accessed and processed during the on-line session.

35. The system of claim 34, further comprising:
a memory configured to store the second information;
wherein the first electronic commerce service provider hosts the second information on behalf of an entity other than the first electronic commerce service provider.

36. The system of claim 34, wherein the first electronic commerce service provider provides the service of making payments on behalf of payors.

37. The system of claim 32, wherein the second information is maintained by a check printing service.

38. A system for authenticating an association between a deposit account and an account holder, comprising:
a communications interface configured to receive first information identifying a first deposit account and an account holder and access second information associated with a plurality of deposit accounts each maintained at one of a plurality of financial institutions, wherein the communications interface is further configured to access third information associated with another plurality of deposit accounts each associated with one of a plurality of financial institutions;
a processor configured to cause the communications interface to access the second information and process the received first information and the accessed second information to authenticate an association between the first deposit account and the account holder, wherein the processor is further configured to, prior to causing the communications interface to access the second information, determine an order in which to access the second information and the third information, cause the communications interface to access a first ordered one of the second and third information, process the first information and the accessed first ordered information to authenticate the association between the first deposit account and the account holder, if the association is not authenticated based upon the processing of the first information and the first ordered information, cause the communications interface to access a second ordered one of the second and third information, and process the first information and the accessed second ordered information to authenticate the association between the first deposit account and the account holder; and
the second information is one of the first ordered information and the second ordered information.

39. The system of claim 38, wherein the ordering is based upon at least one of a routing number associated with the financial institution, geography, cost, and a number of successful authentications based upon information belonging to an entity other than the account holder and the financial institution.

40. The system of claim 38, wherein:
the first information is received by a first electronic commerce service provider; and
the first information is received from one of the account holder, a sponsor associated with the account holder, and a second electronic commerce service provider.

41. The system of claim 40, wherein:
the first information is received during an on-line session for registering for electronic commerce services; and
the processor is further configured to cause the second information to be accessed and processed during the on-line session.

42. The system of claim 41, further comprising:
a memory configured to store the second information;
wherein the first electronic commerce service provider hosts the second information on behalf of an entity other than the first electronic commerce service provider.

43. The system of claim 41, wherein the first electronic commerce service provider provides the service of making payments on behalf of payors.

44. The system of claim 38, wherein the second information is maintained by a check printing service.

45. The system of claim 38, further comprising:
a memory configured to store the third information; wherein the third information is associated with an entity operating the system.

46. The system of claim 38, wherein the processor is further configured to, prior to accessing the second information, determine an order in which to access the second information and third information, wherein the third information is associated with another plurality of deposit accounts.

47. The system of claim 46, wherein the ordering is based upon at least one of a routing number associated with the financial institution, geography, cost, and a number of successful authentications based upon information belonging to an entity other than the account holder and the financial institution.

48. The system of claim 46, further comprising:
a memory configured to store the third information; wherein the third information is associated with an entity operating the system.

* * * * *